United States Patent
Feng et al.

(10) Patent No.: US 9,197,138 B2
(45) Date of Patent: Nov. 24, 2015

(54) VOLTAGE STEP-UP SIX-PHASE AUTOTRANSFORMER PASSIVE RECTIFICATION AC-DC CONVERTER

(71) Applicant: HAMILTON SUNDSTRAND CORPORATION, Charlotte, NC (US)

(72) Inventors: Frank Z. Feng, Loves Park, IL (US); Mustansir Kheraluwala, Lake Zurich, IL (US); Waleed M. Said, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 7 days.

(21) Appl. No.: 14/162,183

(22) Filed: Jan. 23, 2014

(65) Prior Publication Data

US 2015/0097506 A1    Apr. 9, 2015

Related U.S. Application Data

(60) Provisional application No. 61/886,510, filed on Oct. 3, 2013.

(51) Int. Cl.
*H02P 5/00*    (2006.01)
*H02M 7/06*    (2006.01)
*H02P 27/02*   (2006.01)

(52) U.S. Cl.
CPC ........... *H02M 7/06* (2013.01); *H02M 7/068* (2013.01); *H02P 27/02* (2013.01)

(58) Field of Classification Search
CPC .......... H02M 5/14; H02M 7/08; H02M 1/32; H02M 7/12; H02M 7/487; H02M 7/49; H02M 5/458; H02M 7/217; H02J 3/26; H02P 2201/13; H02P 27/06; H02P 5/74; Y02E 40/50; H01F 2019/085; H01F 30/14
USPC ............... 318/105, 500, 504; 336/5, 12, 148; 363/40, 47, 67, 126
See application file for complete search history.

(56) References Cited

U.S. PATENT DOCUMENTS 4,750,098 A * 6/1988 Heinrich et al. ................. 363/10
4,866,591 A * 9/1989 Cook et al. ...................... 363/67

(Continued)

FOREIGN PATENT DOCUMENTS

WO    9819385    5/1998

OTHER PUBLICATIONS

Sewan Choi et al: "Polyphase Transformer Arrangements With Reduced KVA Capacities for Harmonic Current Redeuction in Rectifier Type Utility Interface", Record of the Annual Power Electronics Specialists Conference (PESC). Atlanta, Jun. 12-15, 1995; [Record of the Annual Power Electronics Specialists Conference (PESC)], New York, IEEE, US, vol. 1, Jun. 12, 1995, pp. 353-359 181.

*Primary Examiner* — Paul Ip

(57) ABSTRACT

A three phase step-up autotransformer construction is discussed herein. The passive 12-pulse AC-DC converter offers simplicity, high reliability and low cost solution to AC-DC power conversion. The autotransformer is a component of the passive 12-pulse AC-DC converter. The autotransformer converts three-phase AC power into six-phase AC power. With appropriate vector design, the autotransformer may be configured to draw a near sinusoidal 12-pulse current waveform from the three-phase voltage source. The six-phase output may be configured to drive a rectifier (non-linear) load.

11 Claims, 4 Drawing Sheets

(56) References Cited

U.S. PATENT DOCUMENTS

| | | | |
|---|---|---|---|
| 4,876,634 A * | 10/1989 | Paice | 363/5 |
| 5,079,499 A * | 1/1992 | Owen | 323/361 |
| 5,130,628 A * | 7/1992 | Owen | 318/780 |
| 5,148,357 A * | 9/1992 | Paice | 363/5 |
| 5,446,642 A * | 8/1995 | McMurray | 363/40 |
| 5,446,643 A * | 8/1995 | McMurray | 363/40 |
| 5,455,759 A * | 10/1995 | Paice | 363/126 |
| 5,515,264 A * | 5/1996 | Stacey | 363/132 |
| 5,537,309 A * | 7/1996 | Marsh et al. | 363/155 |
| 5,539,632 A * | 7/1996 | Marsh | 363/155 |
| 5,619,407 A * | 4/1997 | Hammond | 363/155 |
| 5,731,971 A * | 3/1998 | Owen | 363/154 |
| 6,101,113 A * | 8/2000 | Paice | 363/126 |
| 6,191,968 B1 * | 2/2001 | Paice | 363/148 |
| 6,198,647 B1 * | 3/2001 | Zhou et al. | 363/154 |
| 6,249,443 B1 * | 6/2001 | Zhou et al. | 363/5 |
| 6,335,872 B1 * | 1/2002 | Zhou et al. | 363/154 |
| 6,385,064 B1 * | 5/2002 | Zhou et al. | 363/44 |
| 6,396,723 B2 * | 5/2002 | Mochikawa et al. | 363/125 |
| 6,498,736 B1 * | 12/2002 | Kamath | 363/44 |
| 6,525,951 B1 * | 2/2003 | Paice | 363/154 |
| 6,861,936 B2 * | 3/2005 | Kamath | 336/148 |
| 7,049,921 B2 * | 5/2006 | Owen | 336/5 |
| 7,148,661 B2 * | 12/2006 | Trainer et al. | 323/207 |
| 7,274,280 B1 * | 9/2007 | Paice | 336/148 |
| 7,430,132 B2 * | 9/2008 | Morishita | 363/55 |
| 7,772,953 B2 * | 8/2010 | Huang et al. | 336/5 |
| 7,772,954 B2 * | 8/2010 | Huang et al. | 336/5 |
| 7,898,829 B2 * | 3/2011 | Oguchi et al. | 363/44 |
| 8,159,841 B2 * | 4/2012 | Owen | 363/47 |
| 8,299,732 B2 * | 10/2012 | Hoadley et al. | 318/105 |
| 8,488,354 B2 * | 7/2013 | Swamy | 363/126 |
| 8,513,951 B2 * | 8/2013 | Wunderlich et al. | 324/500 |
| 8,723,385 B2 * | 5/2014 | Jia et al. | 310/168 |
| 8,737,097 B1 * | 5/2014 | Swamy | 363/67 |
| 8,810,349 B2 * | 8/2014 | Owen | 336/5 |
| 8,890,642 B2 * | 11/2014 | Pietkiewicz | 336/5 |
| 2001/0004170 A1 * | 6/2001 | Schienbein et al. | 307/18 |
| 2002/0186112 A1 * | 12/2002 | Kamath | 336/5 |
| 2005/0035838 A1 * | 2/2005 | Owen | 336/5 |
| 2005/0135126 A1 * | 6/2005 | Gazel et al. | 363/67 |
| 2005/0146226 A1 * | 7/2005 | Trainer et al. | 307/73 |
| 2006/0001516 A1 * | 1/2006 | Mazur et al. | 336/5 |
| 2007/0195567 A1 * | 8/2007 | Morishita | 363/55 |
| 2008/0165553 A1 * | 7/2008 | Swamy | 363/67 |
| 2009/0045782 A1 * | 2/2009 | Datta et al. | 322/17 |
| 2009/0067206 A1 * | 3/2009 | Oguchi et al. | 363/124 |
| 2009/0212631 A1 * | 8/2009 | Taylor et al. | 307/66 |
| 2009/0251932 A1 * | 10/2009 | Owen | 363/44 |
| 2010/0148899 A1 * | 6/2010 | Huang et al. | 336/12 |
| 2010/0148900 A1 * | 6/2010 | Huang et al. | 336/12 |
| 2010/0176755 A1 * | 7/2010 | Hoadley et al. | 318/105 |
| 2011/0187484 A1 * | 8/2011 | Owen | 336/5 |
| 2011/0216564 A1 * | 9/2011 | Swamy | 363/126 |
| 2013/0121043 A1 * | 5/2013 | Pietkiewicz | 363/40 |
| 2013/0121050 A1 * | 5/2013 | Pietkiewicz | 363/126 |
| 2014/0139168 A1 * | 5/2014 | Trainer et al. | 318/500 |
| 2014/0313800 A1 * | 10/2014 | Swamy | 363/126 |

* cited by examiner

VOLTAGE STEP-UP SIX-PHASE AUTOTRANSFORMER PASSIVE RECTIFICATION AC-DC CONVERTER

CROSS-REFERENCE TO RELATED APPLICATIONS

This application is a nonprovisional of, and claims priority to, and the benefit of U.S. Provisional Application No. 61/886,510, entitled "VOLTAGE STEP-UP SIX-PHASE AUTOTRANSFORMER PASSIVE RECTIFICATION AC-DC CONVERTER," filed on Oct. 3, 2013, which is hereby incorporated by reference in its entirety.

FIELD

The present disclosure relates to AC-DC conversion, and more particularly, to autotransformers.

BACKGROUND

Moving an aircraft from a terminal to a takeoff position is generally referred to as taxiing. Moving the aircraft with the aircraft engine at low speed across the ground is not an efficient use of the aircraft engine. It is beneficial to delay starting the engine until it is needed for aircraft flight operations, such as take-off, flight, landing, etc. A motor coupled to the aircraft wheel, such as an electronically driven wheel, may be more efficient than the use of the aircraft engine for the taxi process. Legacy aircraft generally have standard 115 Volt AC generators onboard. It may be desirable for this power source to drive an electric motor.

SUMMARY

The present disclosure relates to an electric aircraft autotransformer passive rectification AC-DC converter system. The system may comprise a three phase alternating current power source. The system may comprise a twelve pulse passive rectifier AC-DC converter configured for about a 1:1.93 voltage step-up, wherein the three phase alternating current power source is coupled to the twelve pulse autotransformer passive rectifier AC-DC converter. The system may comprise an inverter, wherein the output of the twelve pulse autotransformer passive rectifier AC-DC converter is coupled to the inverter. The system may comprise a motor, wherein an output of the inverter is coupled to the motor.

A step-up autotransformer rectifier unit is disclosed herein. The autotransformer rectifier unit may comprise a first phase input, a second phase input, a third phase input. A three phase AC signal may be delivered to the step-up autotransformer via the first phase input, the second phase input, and the third phase input. The step-up autotransformer may be a 1:1.93 ratio autotransformer.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step.

Figure 1:
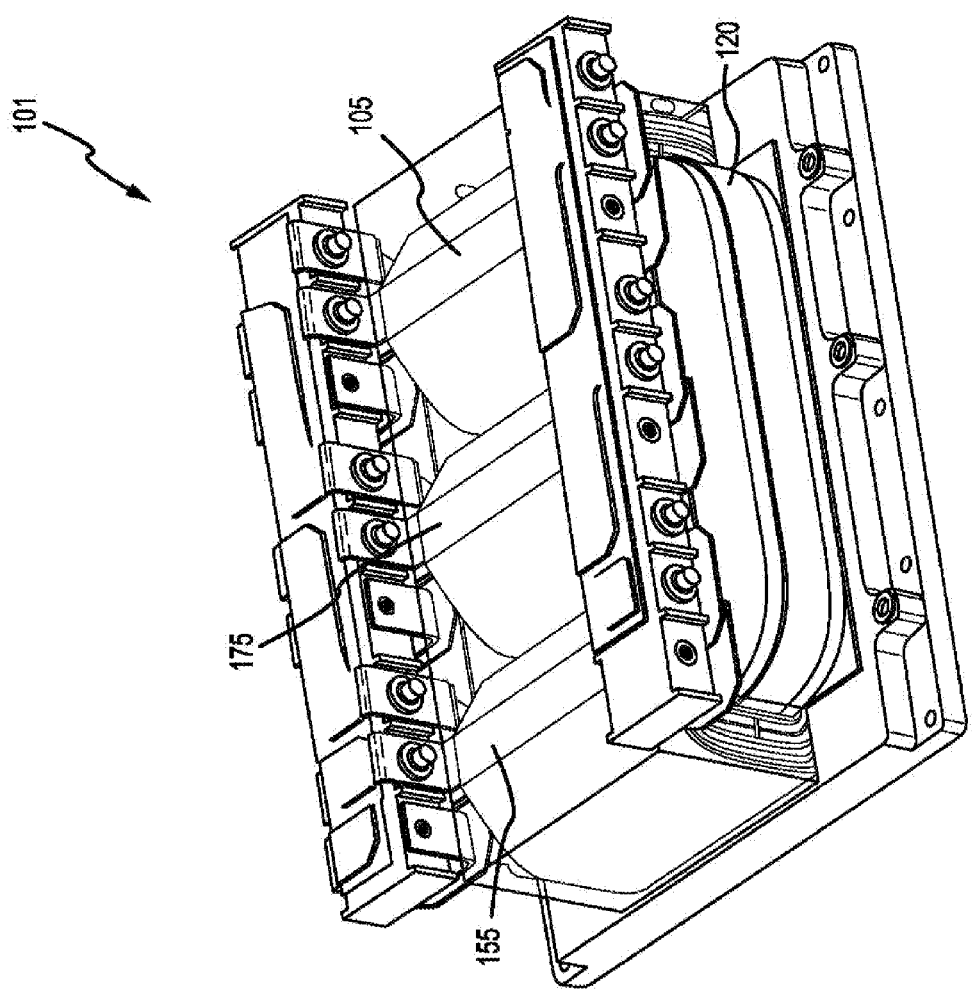
FIG. 1 is a representative autotransformer, in accordance with various embodiments.

According to various embodiments, and with reference to FIG. 1, a three phase autotransformer 101 construction is depicted. The passive 12-pulse AC-DC converter offers a simple, highly reliable and low cost solution to AC-DC power conversion. The autotransformer is a component of the passive 12-pulse AC-DC converter described herein. The autotransformer is configured to convert three-phase AC power into six-phase AC power. With appropriate vector design, the autotransformer may be configured to propagate a near sinusoidal 12-pulse current waveform from the three-phase voltage source. This six-phase output may be configured to drive a rectifier (non-linear) load.

In certain applications (such as an aircraft system, where a three-phase AC source is about a 115 Volt and a six-phase output is desired to provide a voltage boost of the AC input), the autotransformer can be designed to provide the voltage boost function in addition to power conditioning of the rectifier load.

Figure 2:
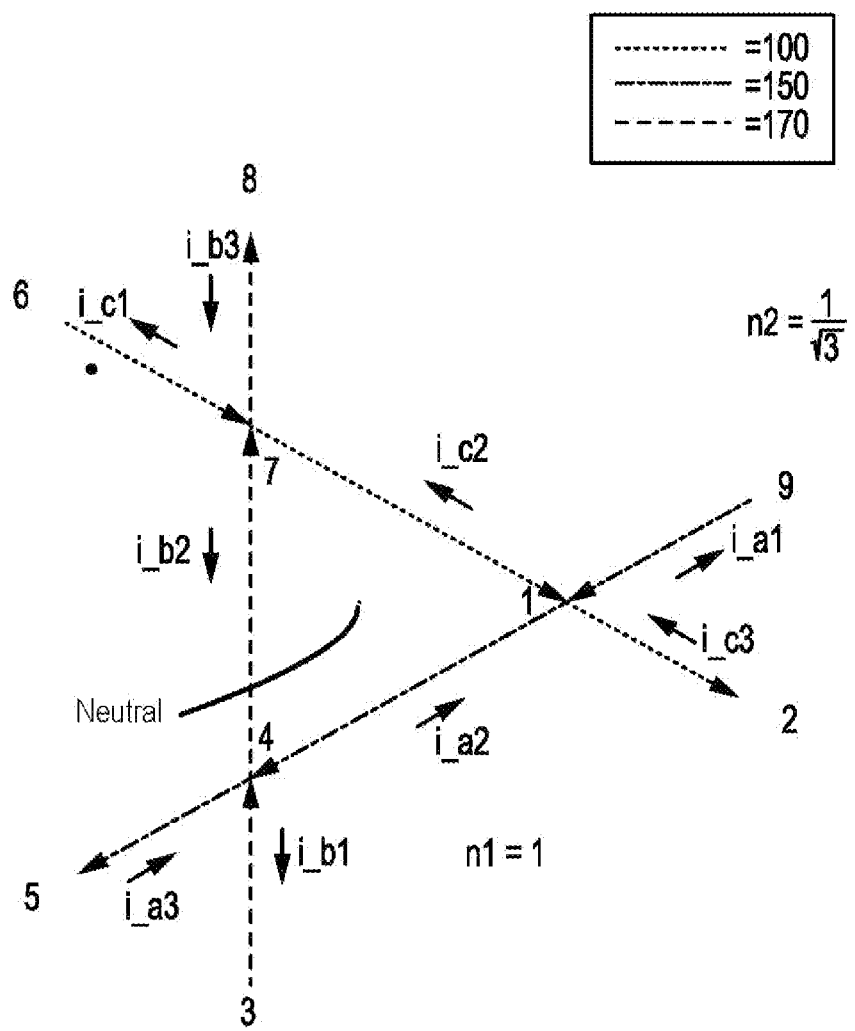
FIG. 2 depicts a AC voltage step-up six-phase autotransformer vector diagram, in accordance with various embodiments.

Taking into consideration the AC voltage step-up six-phase autotransformer vector diagram of FIG. 2, the phase A 150 windings of autotransformer 101 correspond to vectors (4,5), (1,4) and (9,1). The phase B 170 windings correspond to vectors (3,4), (4,7) and (7,8). The phase C 100 windings correspond to vectors (6,7), (7,1) and (1,2). Notably, the AC voltage step-up achieved is a 1:1.93 step-up ratio. All straight lines (vectors) having arrows depicted in FIG. 2 represent windings. The winding turns are proportional to the line (vector) length. The arrows points from the start of the winding to the end of the same winding. The identifying markings associated with the vectors of FIG. 2 (e.g. dotted, dashed, dot-dash-dot) each represent a different phase leg of three phase autotransformer 101. The windings are all wound in the same direction. The resultant AC voltage step-up six-phase autotransformer is designed to be light in weight and simple in design as compared with other variations. A step-up ratio of 2 is preferred. A step-up ratio of 1.93 is well within an acceptable band to drive a load.

The 115V AC input from a generator, such as an aircraft generator, are input to nodes 1,4,7. The step-up AC outputs to a load (about 15° Lag) correspond to nodes 2,5,8. The step-up AC outputs to a load (about 15° Lead) correspond to nodes 3,6,9. The number of turns, n1, between node 1 and node 4, is equal to 1.

The number of turns, n2, between node 1 and node 9, is equal to $$\frac{1}{\sqrt{3}}.$$

The phase shift of voltage vector node 9 to neutral is 15° leading AC input voltage vector node 1 to neutral. The phase shift of voltage vector node 2 to neutral is 15° lagging AC input voltage vector node 1 to neutral. By three phase symmetry, node 3 and 6 voltage vectors to neutral leading node 4 and 7 voltage vectors to neutral by 15°, and node 5 and 8 voltage vectors to neutral lagging node 4 and 7 voltage vectors to neutral by 15° respectively. The step-up ratio is 1:1.93. The kVA rating relative to a three-phase isolation transformer is about 52.3%.

Figure 3:
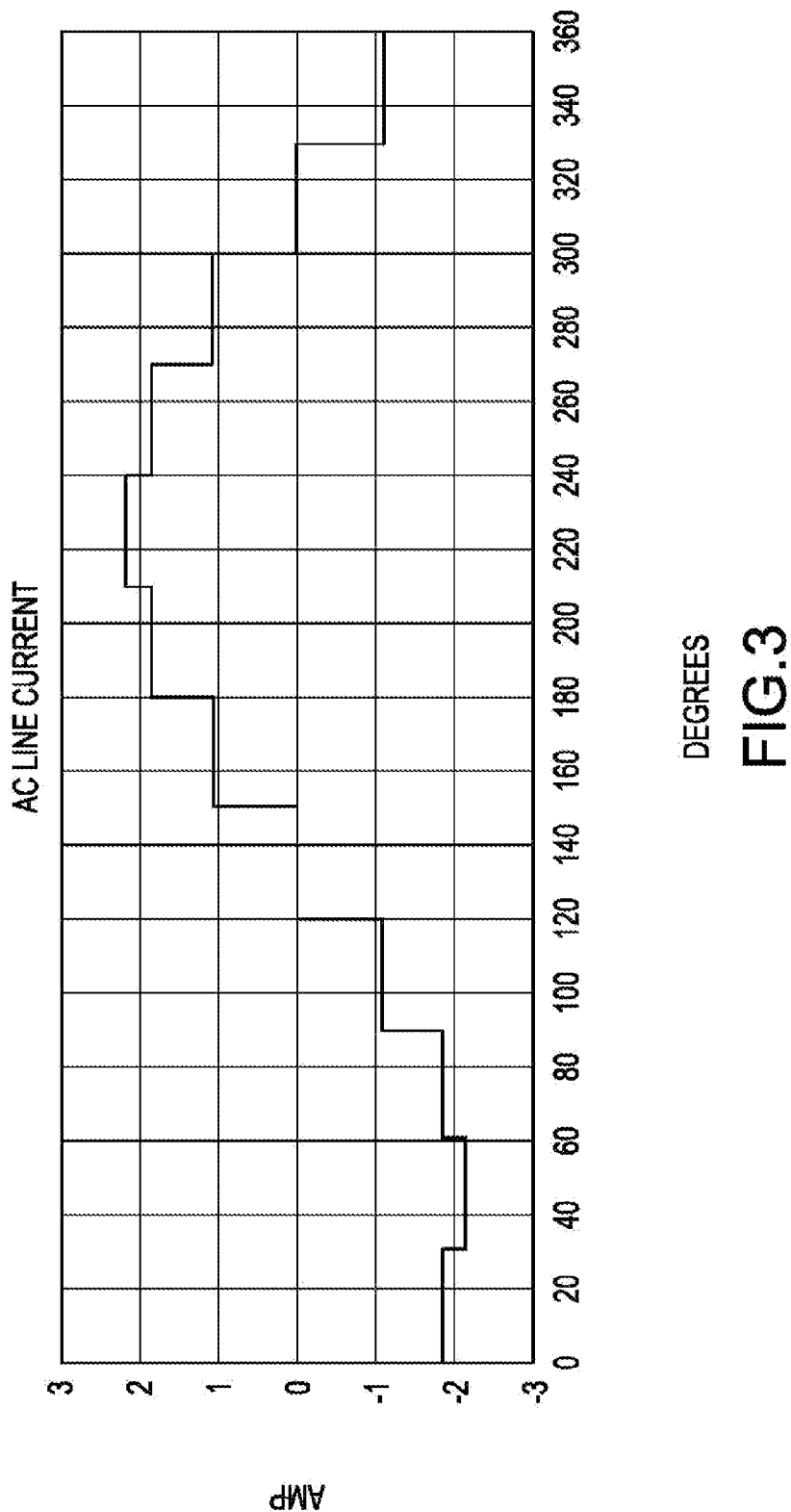
FIG. 3 depicts a AC line current waveform into nodes 1, 4 and 7 of FIG. 2, in accordance with various embodiments.

The AC input current delivered into node 1, 4 and 7 is illustrated in FIG. 3. As can be seen, the 12-pulse waveform approximates a sinusoidal waveform with its twelve steps. In FIG. 3, DC current is normalized as 1 unit. As shown in FIG. 2, neutral is located in the center of the closed triangle (delta nodes 1,4,7) formed by the intersection of the vectors between nodes 1 and 4, 4 and 7, and 7 and 1, depicted as a dot.

Figure 4:
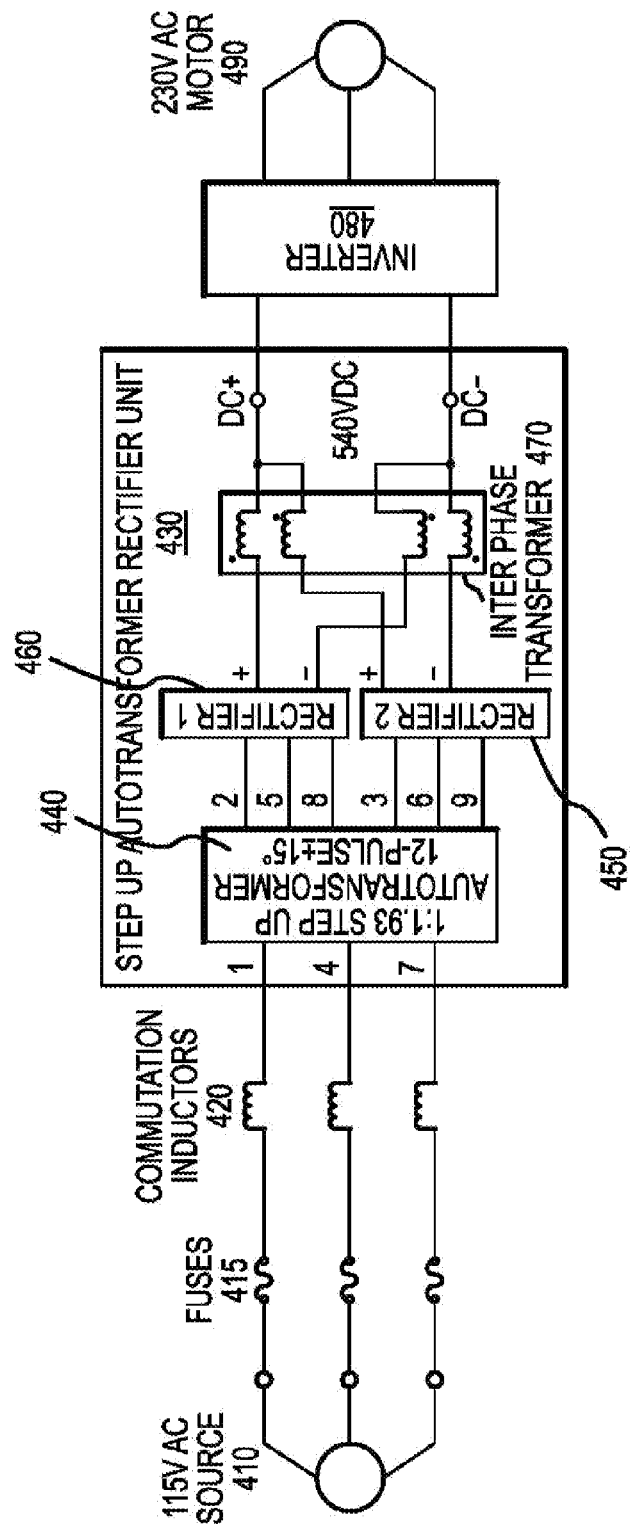
FIG. 4 depicts a simplified 12-pulse autotransformer passive rectifier AC-DC converter with 1:1.93 voltage step-up coupled to an inverter and motor, in accordance with various embodiments.

A simplified block diagram of the autotransformer based AC-DC converter is shown in FIG. 4. An AC source 410, such as a 115V AC source, is provided to the system. The three phases may be coupled to fuses 415 and commutation inductors 420. The three phases may be input to the step-up autotransformer rectifier unit 430.

Notably, delta nodes 1,4,7 are input to the 1:1.93 step-up autotransformer 440. Three phases corresponding to nodes 3,6,9 and three phases corresponding to nodes 2,5,8 are output from autotransformer 440. The three phases corresponding to nodes 2,5,8 output of autotransformer 440 are input to a first rectifier 460. The three phases corresponding to nodes 3,6,9 outputs of autotransformer 440 are input to a second rectifier 450. The first rectifier 460 and second rectifier 450 are configured to convert alternating current to direct current. The outputs of first rectifier 460 and second rectifier 450 are input to an interphase transformer 470. About 540 VDC is output from the step-up autotransformer rectifier unit 430. This 540 VDC may be provided to an inverter 480 for driving a load such as an AC motor. For instance, the output from the step-up autotransformer rectifier unit 430 may be converted to AC current via inverter 480 and provided to power a 230 V AC motor 490. Motor 490 may drive a wheel of an aircraft, such as for taxiing purposes.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more."

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A rectifier system comprising:
   a twelve pulse step-up autotransformer configured to receive a three phase AC input and produce a six phase, 12 pulse AC output;
   a first rectifier configured to receive three phases of the six phase AC output and generate a first DC output;
   a second rectifier configured to receive the remaining three phases of the six phase AC output and generate a second DC output; and
   an interphase transformer configured to receive the first DC output and the second DC output and to generate a combined DC output,
   wherein the step-up autotransformer is a $$1 : \frac{(\sqrt{6} - \sqrt{2})(\sqrt{3} + 2)}{2}$$

ratio autotransformer.

2. The rectifier system of claim 1, wherein an output signal of the interphase transformer is input to an inverter to produce an AC output.

3. The rectifier system of claim 2, wherein the AC output of an inverter is delivered to an electric motor configured to drive a wheel of an aircraft.

4. The rectifier system of claim 1, wherein the autotransformer may be configured to propagate a near sinusoidal 12-pulse current waveform from the three phase AC input.

5. The rectifier system of claim 1, wherein a 115 volt three phase AC source provides the three phase AC input.

6. The rectifier system of claim 1, wherein the step-up ratio is 1:1.93.

7. The rectifier system of claim 1, wherein secondary voltages of the autotransformer may undergo a phase shift of either about +15° leading or about −15° lagging with respect to a neutral reference point.

8. The rectifier system of claim 1, wherein a number of turns between a node 1 and a node 4 is equal to 1.

9. The rectifier system of claim 1, wherein a number of turns between a node 1 and a node 9 is equal to $$\frac{1}{\sqrt{3}}.$$

10. An electric aircraft passive rectification AC-DC converter system comprising:
 a three phase alternating current power source;
 a twelve pulse passive rectifier AC-DC converter configured for a 1:1.93 voltage step-up and including:
  a twelve pulse step-up autotransformer configured to receive a three phase AC input and produce a six phase, 12 pulse AC output,
  a first rectifier configured to receive three phases of the six phase AC output and generate a first DC output,
  a second rectifier configured to receive the remaining three phases of the six phase AC output and generate a second DC output, and
  an interphase transformer configured to receive the first DC output and the second DC output and to generate a combined DC output;
 an inverter; and
 a motor,
 wherein the three phase alternating current power source is coupled to the twelve pulse autotransformer passive rectifier AC-DC converter,
 wherein the output of the twelve pulse passive rectifier AC-DC converter is coupled to the inverter, and
 wherein an output of the inverter is coupled to the motor.

11. The electric aircraft autotransformer passive rectification AC-DC converter system of claim 10, wherein the AC source is about a 115 volt AC source, and wherein the motor is about a 230 volt AC motor.

* * * * *